US011164283B1

(12) United States Patent
Liu et al.

(10) Patent No.: US 11,164,283 B1
(45) Date of Patent: Nov. 2, 2021

(54) LOCAL IMAGE WARPING IN IMAGE PROCESSOR USING HOMOGRAPHY TRANSFORM FUNCTION

(71) Applicant: Apple Inc., Cupertino, CA (US)

(72) Inventors: Kaiming Liu, Santa Clara, CA (US); Maxim Smirnov, Portland, OR (US); David R. Pope, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/858,134

(22) Filed: Apr. 24, 2020

(51) Int. Cl.
*G06T 3/00* (2006.01)
*G06T 3/40* (2006.01)

(52) U.S. Cl.
CPC .......... *G06T 3/0093* (2013.01); *G06T 3/4007* (2013.01); *G06T 3/4084* (2013.01)

(58) Field of Classification Search
CPC .... G06T 3/0093; G06T 3/4007; G06T 3/4084
See application file for complete search history.

(56) References Cited

U.S. PATENT DOCUMENTS

| | | | |
|---|---|---|---|
| 6,614,442 | B1 | 9/2003 | Ouyang et al. |
| 6,756,993 | B2 | 6/2004 | Popescu et al. |
| 8,660,383 | B1 | 2/2014 | Callari et al. |
| 9,008,460 | B2 | 4/2015 | Shechtman et al. |
| 9,251,169 | B2 | 2/2016 | Smith |
| 9,852,238 | B2 | 12/2017 | Forsyth et al. |
| 2006/0267989 | A1 | 11/2006 | Campbell et al. |
| 2008/0298689 | A1* | 12/2008 | Ashbrook ............... H04N 5/76 382/224 |
| 2009/0066726 | A1 | 3/2009 | Kato et al. |
| 2010/0026697 | A1 | 2/2010 | Xiang et al. |
| 2012/0148164 | A1* | 6/2012 | Suk ...................... G06K 9/6206 382/201 |
| 2014/0028876 | A1 | 1/2014 | Mills |
| 2014/0118376 | A1 | 5/2014 | Hakura et al. |
| 2014/0362240 | A1* | 12/2014 | Klivington ............... G06T 5/50 348/208.1 |
| 2014/0368536 | A1 | 12/2014 | Ao et al. |

(Continued)

FOREIGN PATENT DOCUMENTS

WO    WO 2013/0159330 A1    10/2013

OTHER PUBLICATIONS

Li, N. et al., "Quasi-homography Warps in Image Stitching," arXIV: 1701.08006v2, Mar. 18, 2018, pp. 1-10.

(Continued)

*Primary Examiner* — Haixia Du
(74) *Attorney, Agent, or Firm* — Fenwick & West LLP

(57) ABSTRACT

A feature extractor determines reference feature locations from a portion of a reference image and corresponding feature locations from a portion of a warp image. A transform module determines a homography transform function that transforms versions of the corresponding feature locations to the reference feature locations. The homography transform function has an error below a threshold level, where the error represents a difference between the transformed corresponding feature locations and the reference feature locations. The local transform module generates transform parameters by processing the homography transform function. A warper circuit warps the portion of the warp image by at least applying the transform parameters to generate a portion of a warped image.

20 Claims, 8 Drawing Sheets

(56) References Cited

U.S. PATENT DOCUMENTS

2015/0325044 A1    11/2015  Lebovitz
2015/0332114 A1*   11/2015  Springer ............ G06K 9/00805
                                                           348/148
2015/0379666 A1    12/2015  Redzic et al.
2016/0267349 A1     9/2016  Shoaib et al.

OTHER PUBLICATIONS

The Linux Information Project, "RAM: A Brief Introduction," Jul. 9, 2004, pp. 1-3, [Online] [Retrieved on Jun. 14, 2018] Retrieved from the Internet <URL: http://www.linfo.org/ram.html>.
Wikipedia, "Bilinear Interpolation," Jun. 17, 2016, pp. 1-3, [Online] [Retrieved on Jun. 13, 2018] Retrieved from the Internet Archive <URL: https://web.archive.org/web/20160617032938/https://en.wikipedia.org/wiki/Bilinear_interpolation>.

\* cited by examiner

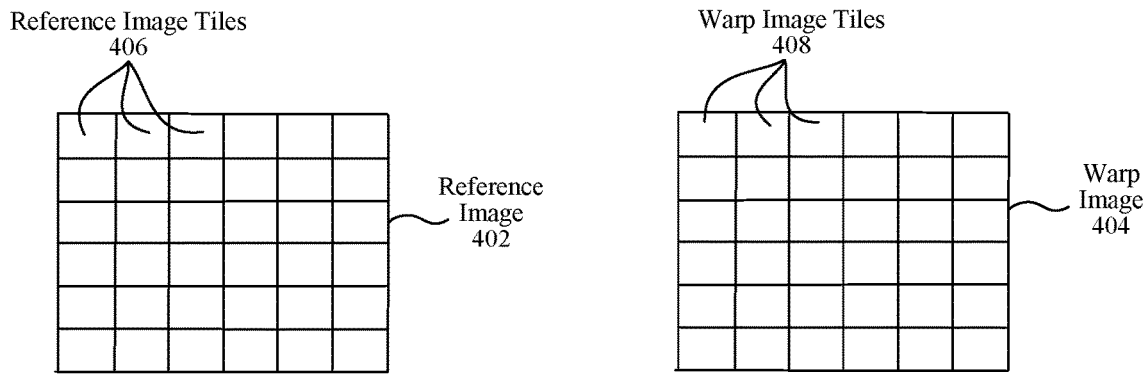
FIG. 4
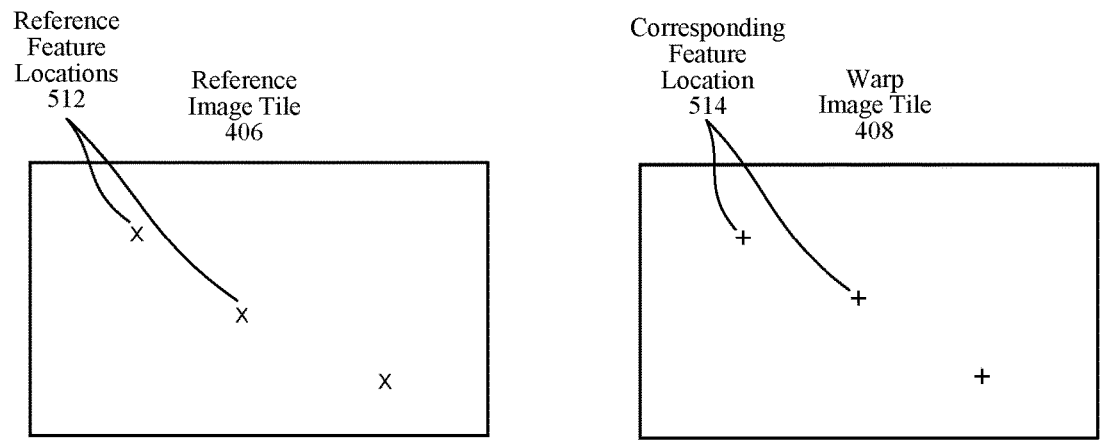
FIG. 5A        FIG. 5B
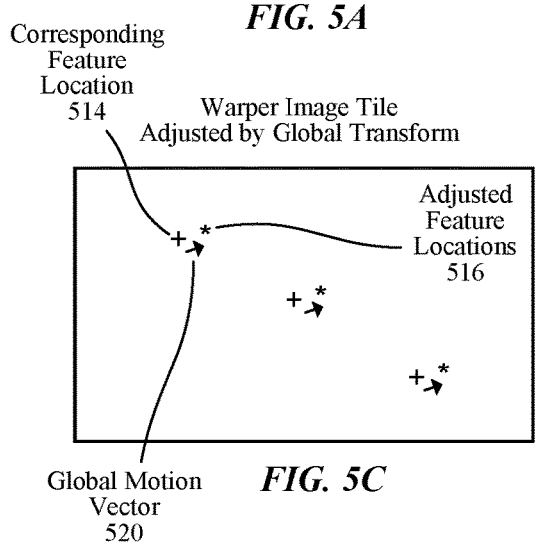 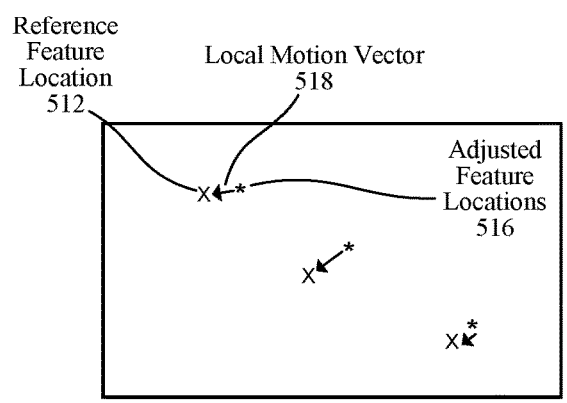
FIG. 5C        FIG. 5D

LOCAL IMAGE WARPING IN IMAGE PROCESSOR USING HOMOGRAPHY TRANSFORM FUNCTION

BACKGROUND

Field of the Disclosure

The present disclosure relates to warping an image and more specifically to warping groups of pixels in the image differently than other groups of pixels.

Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

In certain image processing procedures, it is desirable to perform image fusion. Image fusion includes gathering information from multiple images and includes the information in a fewer number of images, usually a single image. This single image may be more informative and accurate than any image from the original images. Since the images for fusion are often captured at different times and/or or locations, these images do not completely match. Hence, warping of one image may be performed prior to fusing with another image.

SUMMARY

Embodiments relate to local image warping by warping groups of pixels of an image differently than other groups of pixels. A feature extractor is configured to determine first reference feature locations from a first portion of a reference image and first corresponding feature locations from a first portion of a warp image to be warped based on the reference image. A local transform module coupled to the feature extractor is configured to determine a first homography transform function that transforms versions of the first corresponding feature locations to the first reference feature locations is determined. The holography transform function has a first error that represents a difference between the transformed first corresponding feature locations and the first reference feature locations below a threshold level. The local transform module generates first parameters by processing the first homography transform function. A warper circuit coupled to the local transform module warps the first portion of the warp image by at least applying the transform first parameters to generate a first portion of a warped image.

In some embodiments, the feature extractor further determines second reference feature locations from a second portion of the reference image and second corresponding feature locations from a second portion of the warp image. The local transform module determines a second homography transform function that transforms versions of the second corresponding feature locations to the second reference feature locations with a second error representing a difference between the transformed second corresponding feature locations and the second reference feature locations below the threshold level. The first homography function and the second homography function are different.

In some embodiments, the apparatus the local transform module further generates second transform parameters by processing the second homography transform function. The warper circuit warps the second portion of the warp image by at least applying the second transform parameters to generate a second portion of the warped image.

In some embodiments, the first transform parameters map locations in the first portion of the warp image to first locations in the warped image and the second transform parameters map locations in the second portion of the warp image to second locations in the warped image.

In some embodiments, the first transform parameters representing a location in the first portion of the warp image are generated by bilateral interpolating four homography transform functions of four portions of the warp image closest to the location. The first portion of the reference image is one of the four portions of the warp image.

In some embodiments, a global adjustment module is configured to determine global transform parameters that represent a global translation between the reference image and the warp image. The global adjustment module is configured to generate the versions of the corresponding feature locations based on the global transform parameters.

In some embodiments, the global transform parameters are determined by a random sample consensus (RANSAC) algorithm.

In some embodiments, the local transform module applies an optimization algorithm to determine the homography transform function. In some embodiments, the optimization algorithm comprises a least squares algorithm.

In some embodiments, the homography transform function represents two or more degrees of freedom.

BRIEF DESCRIPTION OF THE DRAWINGS

FIG. 4 is an illustration of a reference image and a warp image, according to an embodiment.

FIG. 5A is a diagram of a reference image tile, according to an embodiment.

FIG. 5B is a diagram of a warp image tile that corresponds to the reference image tile, according to an embodiment.

FIG. 5C illustrates global motion vectors, according to an embodiment.

FIG. 5D illustrates local motion vectors, according to an embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

To increase the alignment of features in images before fusing them, in some embodiments, a warp image is globally and locally warped. Local warping is performed by warping groups of pixels in the warp image differently compared to other groups of pixels in the image. To perform local warping, a tiler circuit divides the warp and reference images into discrete tiles. Vectors between feature locations in a warp image tile and feature locations in a corresponding reference image tile are computed. A homography transform function is determined based on the vectors. After homography transform functions are determined for a set of warp image tiles, parameters of the homography transform functions are interpolated to determine a set of grid points. The grid points collectively form a mesh grid that determines how the warp image is warped. By warping the warp image according to the mesh grid, groups of pixels in the warp image may be warped differently. Thus, alignment of the warp image features with the reference image features is improved.

Exemplary Electronic Device

Figure 1:
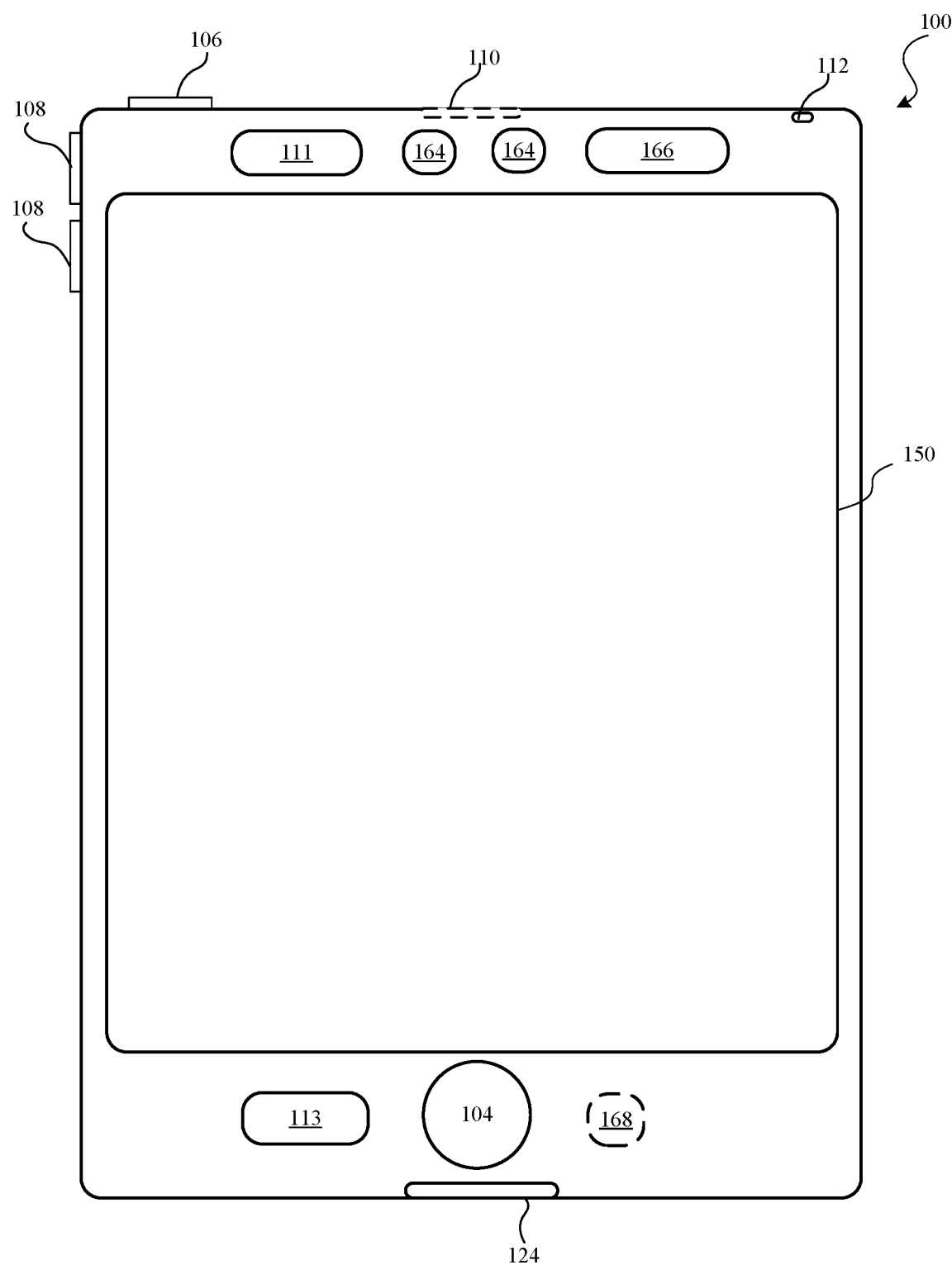
FIG. 1 is a high-level diagram of an electronic device, according to an embodiment.

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure (FIG.) 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller; one or more central processing units (CPUs), a peripherals interface, an RF circuitry, an audio circuitry, speaker 111, microphone 113, input/output (PO) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which gray be combined into a components or have a different configuration or arrangement. The various components of device 100 listed above are embodied in hardware, software, firmware or a combination thereof, including one or more signal processing and/or application specific integrated circuits (ASICs).

Figure 2:
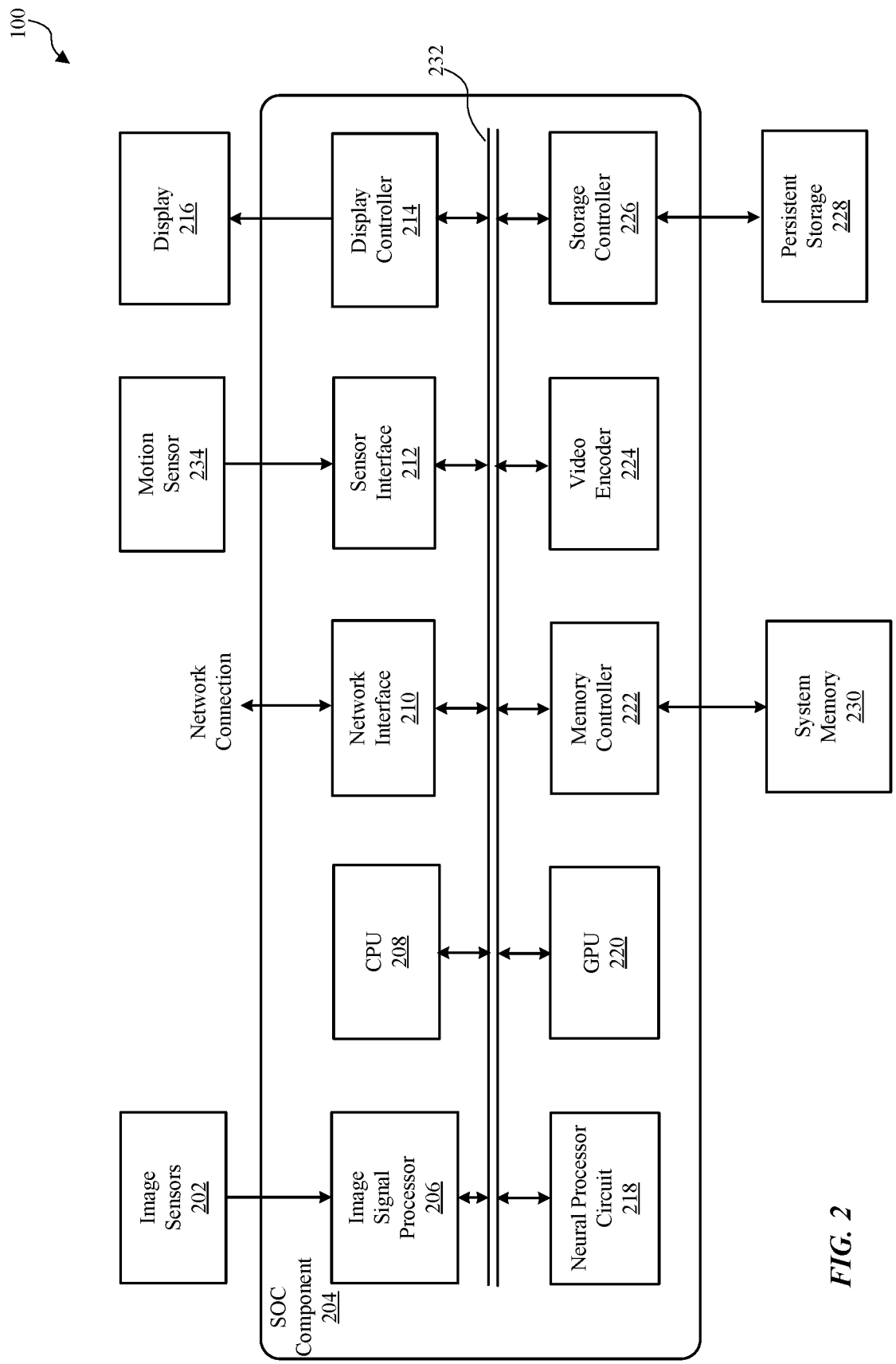
FIG. 2 is a block diagram illustrating components in the electronic device, according to an embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, motion sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor) a camera, video camera, or other devices. Image sensor 202 generates raw-image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional network networks (CNNs), recurrent network networks (RNNs), autoencoders, and long short term memory (LSTM). A machine learning model may be an independent model that works with the neural processor circuit 218 and various software applications or sensors of device 100. A machine learning model may also be part of a software application. The machine learning models may, perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computation used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, neural processor circuit 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may cute graphics software to perform a part or all of the graphics operation, or hardware acceleration of certain graphics operations.

The neural processor circuit 218 is a programmable circuit that performs machine learning operations on the input data of neural processor circuit 218. Machine learning operations may include different computations for training of a machine learning model and for performing inference or prediction based on the trained machine learning model. The neural processor circuit 218 is a circuit that performs various machine learning operations based on computation including multiplication, addition, and accumulation. Such computation may be arranged to perform, for example, various types of tensor multiplications such as tensor product and convolution of input data and kernel data. The neural processor circuit 218 is a configurable circuit that performs these operations in a fast and power-efficient manner while relieving CPU 208 of resource-intensive operations associated with neural network operations. The neural processor circuit 218 may receive the input data from sensor interface 212, the image signal processor 206, persistent storage 228, system memory 230 or other sources such as network interface 210 or GPU 220. The output of the neural processor circuit 218 may be provided to various components of device 100 such as image signal processor 206, system memory 230 or CPU 208 for various operations.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area. Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from notion sensor 234 and processes the sensor information to determine the orientation or movement of the device 100.

Display controller 214 is circuitry for sending image data to be displayed on display 216. Display controller 214 receives the image data from ISP 206, CPU 208, graphic processor 220 or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204, Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
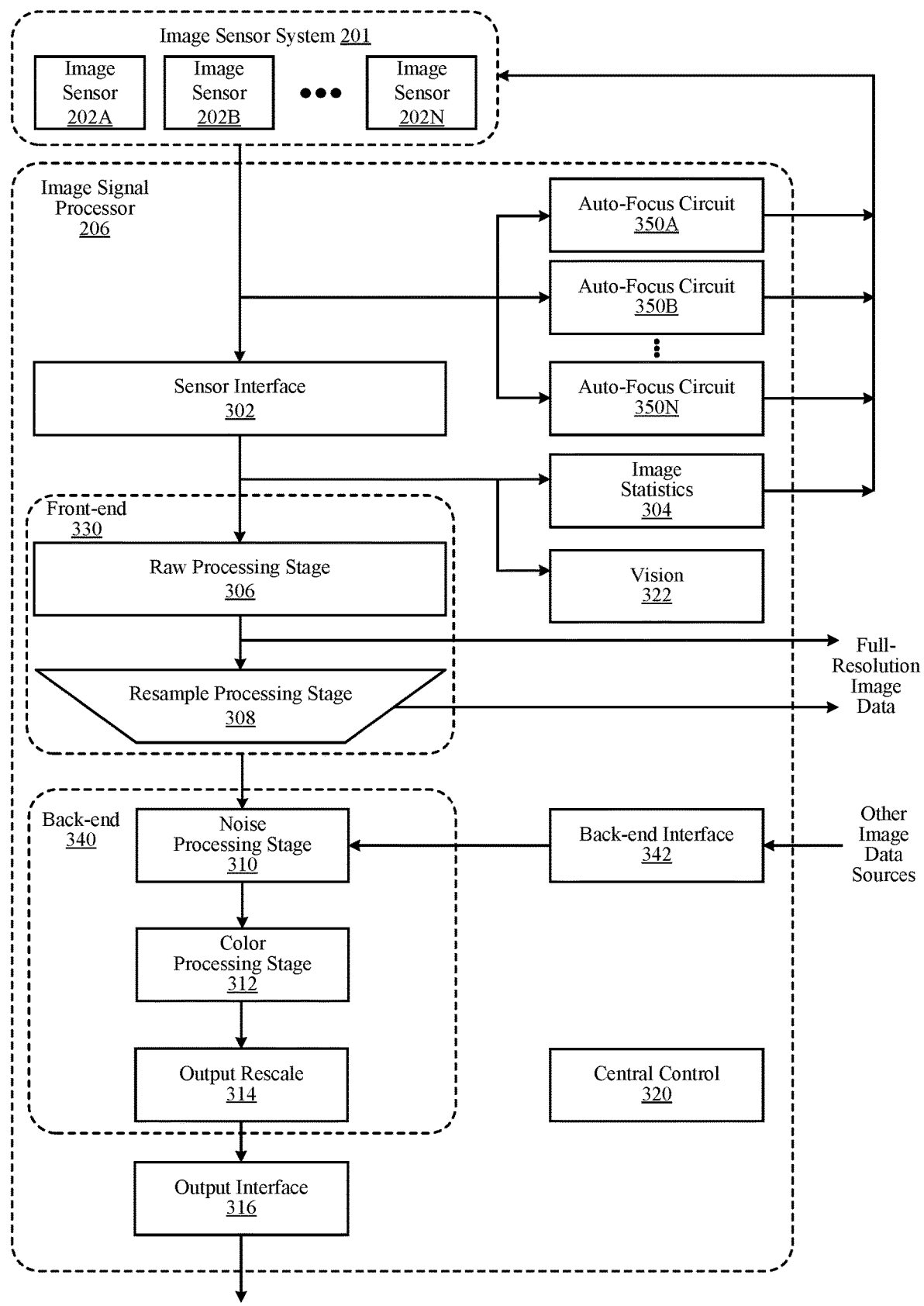
FIG. 3 is a block diagram illustrating image processing pipelines implemented using an image signal processor, according to an embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may be share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include hardware circuit that analyzes raw image data to determine an appropriate lens position of each image sensor 202. In one embodiment, the image data may include data that is transmitted from image sensing pixels that specializes in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end 330 and back-end 340. This allows the ISP 206 to perform auto-focusing analysis independent of other image processing pipelines. For example, the ISP 206 may analyze raw image data from the image sensor 202A to adjust the lens position of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamless transition from image data captured by one image sensor 202 to image data captured by another image sensor without waiting for the second image sensor 202 to adjust its lens position because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components e.g., R, B, Gb in Bayer format), Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics Auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format. Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Loma sharpening may sharpen luma values of pixel data while chroma suppression may attenuate chroma to gray (e.g., no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering the spatial noise filter may be applied to an image frame after it is stored as a reference image frame and thus the reference frame is not spatially filtered.

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying t curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Image Warping Operation

FIG. 4 is an illustration of a reference image 402 and a warp image 404, according to an embodiment. The images 402, 404 may include similar content and may have been recorded at different times and/or locations. For example, the warp image 404 was captured by the sensor system 201 after the reference image 402 was captured. As further described below, the warp image 404 is warped (e.g., globally and locally) based on the reference image 402 so that the images 402, 404 can be fused together. While the description herein only references a single warp image 404, multiple different warp images may be warped in preparation for fusing with the reference image 402.

A tiler circuit (described with reference to FIG. 7) divides the reference image 402 into discrete image tiles 406. The tiler circuit also divides the warp image 404 into discrete image tiles 408 that correspond to the reference image tiles 406. A tile 406, 408 may also be referred to as a portion of an image. Each image tile 406, 408 is an array of pixels. A tile may be an M×N rectangular array, where M is the number of pixels in the horizontal direction and N is the number of pixels in the vertical direction. M is an integer greater than 1 but smaller than the horizontal resolution of the image. N is an integer greater than 1 but smaller than the vertical resolution of the image. For example, an image is in YCbCr 4:2:2 format and has a resolution of 4608×2592. The luma data of the image may be divided into 32×4 image tiles, thereby resulting in 93,312 image tiles for the luma data of the image. Additionally, the chroma data of the image may be divided into 32×4 image tiles, thereby resulting in 93,312 image tiles for the chroma data.

FIG. 5A is a diagram of a reference image tile 406, according to an embodiment. The tile 406 includes reference features at locations 512. FIG. 5B is a diagram of a warp image tile 408 that corresponds to the reference image tile 406, according to an embodiment. For example, the warp image tile 408 may be the same tile location as the reference image tile 406 (e.g., top left tile of each image). The tile 408 includes corresponding features at locations 514.

The feature locations 512, 514 are locations of keypoints in the warp and reference images. Feature extractors in the vision 322 may identify these keypoints (see descriptions with reference to FIGS. 3 and 8). Examples of keypoints include objects and sharp edges. As the name suggests, the corresponding feature locations 514 correspond to the reference feature locations 512. Said differently, the reference feature locations 512 and the corresponding feature locations 514 indicate the locations of features that are in both image tiles 406, 408. However, since the images may have been recorded at different times and/or locations, the reference feature locations 512 are likely different than the corresponding feature locations 514.

FIG. 5C illustrates global motion vectors 520 (indicated by arrows), according to an embodiment. Global motion vectors may be determined by comparing reference feature locations 512 in all of (or a set of) the reference image tiles 406 with corresponding feature locations 514 in all of (or a set of) the warp image tiles 408. Global motion vectors 520 are illustrative of a global transform performed on the warp image tile 408. A global transformation is a transformation that is applied to an entire image (e.g., applying a single transformation matrix to the image). This is illustrated in FIG. 5C by the global motion vectors 520 having the same magnitude and direction, however this may not be true for other global transformations in the example of FIG. 5C, corresponding feature locations 514 are shifted (e.g., translated) to the right and upward by the transform. In another example, the global transformation is a rotation about the center of an image. In this example, the magnitude of the global motion vectors varies based on their distance from the center. The locations of the corresponding feature locations 514 after the global transformation may be referred to as adjusted feature locations 516 or referred to as a version of the corresponding feature locations.

FIG. 5D illustrates local motion vectors 518, according to an embodiment. Local motion vectors 518 are determined by comparing the adjusted feature locations 516 with the reference feature locations 512. The local motion vectors 518 may have different magnitudes and directions compared with each other. While FIGS. 5C and 5D suggest that two separate warping operations are performed (a global transformation and a local transformation), practically a single warping operation that incorporates both the global and local vectors may be performed. As further described with reference to FIG. 8, the local motion vectors 518 are used to determine a homography transform function for the warp image tile 408. The homography transform function may be used, in part, to determine grid points of a mesh grid. The mesh grid determines how the warp image 404 will be warped and is described below.

Figure 6:
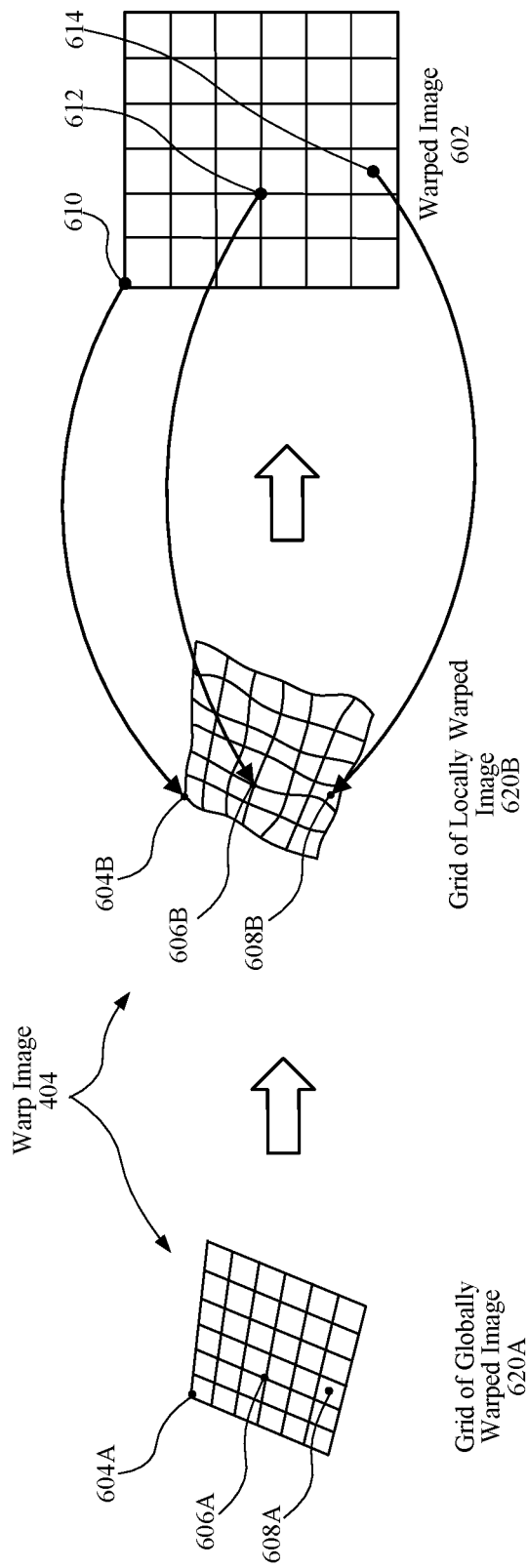
FIG. 6 is a conceptual diagram illustrating warping of the warp image into the warped image using a mesh grid, according to an embodiment.

FIG. 6 is a conceptual diagram illustrating warping of the warp image 404 into the warped image 602 using a mesh grid 620B, according to one embodiment. The mesh grid 620 defines the warping to be performed on the warp image 404. Specifically, each grid point in the mesh grid 620 represents a transformation matrix for a group of pixels of the warp image 404. Said differently, the mesh grid 620 is a grid of points that maps pixel locations in the warp image 404 to pixel locations in the warped image 602. For example, if mesh grid 620B is used, then input coordinates 604B, 606B, and 608B map to output coordinates 610, 612, and 614, respectively. If mesh grid 620A is used, then input coordinates 604A, 606A, and 608A map to output coordinates 610, 612, and 614, respectively. The mesh grids 620 can be coarser or finer than the grids illustrated in FIG. 6. To achieve a desired amount of local warping, the mesh grid may include multiple grid points in each image tile.

Mesh grid 620A illustrates the warp image 404 for performing a homograph); global transformation (e.g., translation and rotation) whereas mesh grid 620B is for performing a global transformation and a local transformation, Because mesh grid 620B performs the local transformation, mesh grid 620B is irregular in shape and is modified from grid 620A by interpolating homography transform function parameters associated with image tiles, as described below in detail with reference to FIG. 8. Thus, by warping the warp image 404 according to grid 620B, groups of pixels in the warp image 404 may undergo different transformations depending on their locations on the warp image 404.

Example Circuits for Image Warping Operation

Figure 7:
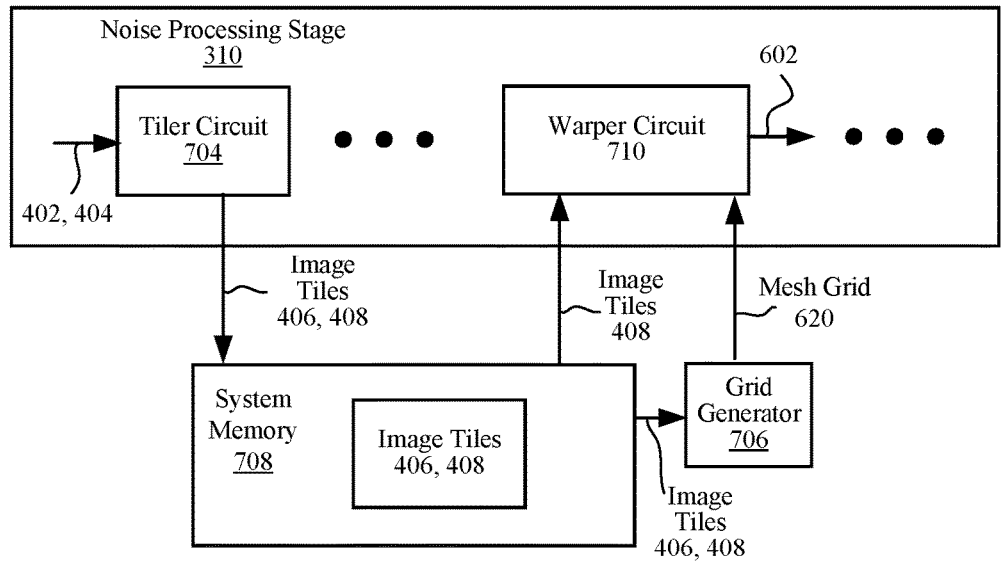
FIG. 7 is a block diagram illustrating modules related to local image warping, according to an embodiment.

FIG. 7 is a block diagram illustrating modules related to local image warping, according to an embodiment. FIG. 7 includes the noise processing stage 310, the system memory 708, and a grid generator 706. The noise processing stage 310 may perform a per-pixel perspective transformation on the warp image data 404 to output the warped image 602. In the embodiment shown in FIG. 7, the noise processing stage 310 includes a tiler circuit 704 and a warper circuit 710. The noise processing stage 310 may include other modules than those illustrated in FIG. 7. In some embodiments, the modules that perform the per-pixel perspective transformation are located in other stages, such as the output rescale 314.

The tiler circuit 704 receives image data of the warp image 404 and the reference image 402 from the front-end pipeline stage 330 and generates tiled versions of the images that are stored in memory 708. The received image data can be in a format such as YCbCr 4:2:2. However, in other embodiments the image data can be in YCbCr 4:4:4 or other appropriate image formats.

In some embodiments, the memory 708 is dynamic random access memory (DRAM). The memory 708 can be located in an integrated circuit (IC) chip that is separate from the IC chip that the noise processing state 310 is located on. For example, the memory 708 can represent one or more dedicated DRAM memory chips. The memory 708 may be the same as the system memory 230 shown in FIG. 2. In other embodiments, the noise processing stage 310 and the memory 708 can be located within the same IC chip.

The memory 708 allows data to be written to and read from the memory 708 during a memory access transaction. Due to hardware constraints, the number of bytes transferred in a single memory access transaction is typically a fixed number of bytes. For example, if the interface to the memory 708 is 128 bits wide and the burst length of a memory access transaction is 8 bits, then the fixed size of the memory access transaction is 8×128=1024 bits=128 bytes.

The grid generator 706 generates a mesh grid 620. As previously stated, the mesh grid 620 is a mapping of pixel coordinate locations from the warp image 404 to pixel coordinate locations of the warped image 602. The grid generator 706 is further described with reference to FIG. 8.

The warper circuit 710 retrieves warp image tiles 408 from memory 708 in accordance with the mesh grid 620 from the grid generator 706. The warper circuit 710 uses the warp image tiles 408 and the mesh grid 620 to transform the warp image 404 into the warped image 602. Among other advantages, using the image tiles 408 to perform warping allows the warper circuit 710 to perform large amounts of image warping without increasing the size of the buffer in the warper circuit 710. The warper circuit 710 is further described with reference to FIG. 9.

Figure 8:
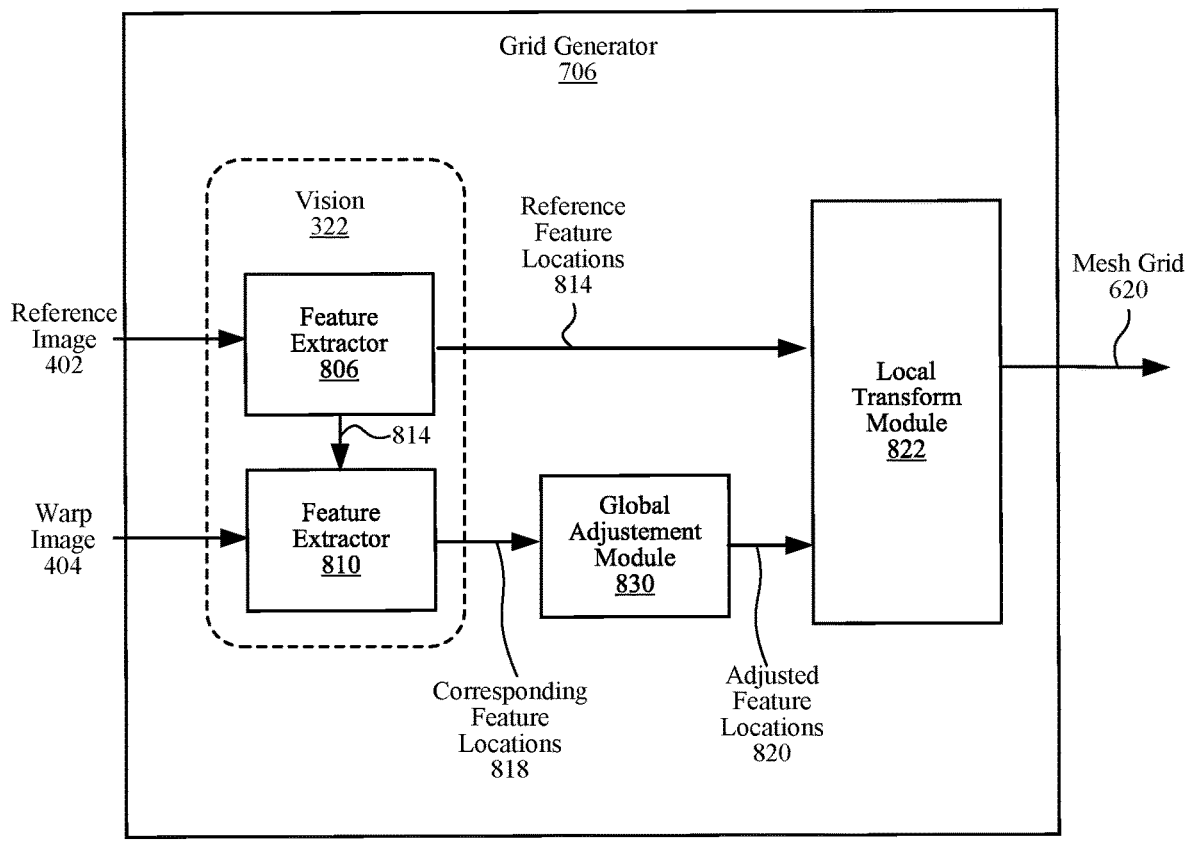
FIG. 8 is a block diagram of the grid generator, according to an embodiment.

FIG. 8 is a block diagram of the grid generator 706, according to an embodiment. The grid generator 706 includes feature extractors 806 and 810, a global adjustment module 830, and a local transform module 822. The feature actors 806, 810 may be components of the vision 322. In some embodiments, the feature extractors 806, 810 are implemented as dedicated circuits. In other embodiments, the feature extractors 806, 810 may be implemented as software that is executed by the CPU 208 or GPU 220.

Feature extractor 806 receives reference image data 402 tiles 406 from system memory 708) and performs keypoint detection to identify reference feature locations 814 in the reference image 402. The reference feature locations 814 are sent to the local transform module 822 and the feature extractor 810. Feature extractor 810 receives warp image data 404 (e.g., tiles 408 from system memory 708), reference feature locations 814 from feature extractor 806, and performs keypoint detection (based on reference feature locations 814) to identify corresponding feature locations 818 in the warp image 404. For example, feature extractor 810 finds a corresponding feature location 818 for each reference feature location 814 by searching within a neighborhood window of each of the reference feature location 814. The corresponding feature locations 818 are sent to the global adjustment module 830. Reference feature locations 814 are also sent to the global adjustment module 830, for example by extractor 810 or extractor 806 (not illustrated). As described above with reference to FIGS. 5A-5D, the feature locations 814, 818 are locations of keypoints in the warp and reference images, respectively. The feature extractor 810 may perform the same operations as the feature extractor 806. In some embodiments, feature extractor 806 and 810 are a single module.

The global adjustment module 830 determines adjusted feature locations 820 based on the received the feature locations 814, 818. The global adjustment module 830 may determine the adjusted feature locations 820 by determining global transform parameters of a global transform. Parameters of the global transform may be determined by a random sample consensus (RANSAC) algorithm. The adjusted feature locations 820 are determined based on the global transform parameters. The adjusted feature locations 820 are sent to the local transform module 822. In some embodiments, the global adjustment module 830 transmits other information to the local transform module 822, such as the global transform parameters, global motion vectors 520, and/or the corresponding feature locations 818.

The local transform module 822 determines the mesh grid 620B based on the received adjusted feature locations 820 and the reference feature locations 814. Mesh grid 620B may also be based on other information from the local transform module 822, such as the global transform parameters. In particular, to determine the mesh grid 620B, the local transform 822 determines one or more homography transform functions and generates grid points based on the determined homography transform functions. A homography transform function is a transformation matrix that can warp image data according to multiple degrees of freedom (e.g., two or more). For example, the homography transform function can perform a translation transformation in 2 degrees of freedom, a rigid rotation transformation in 3 degrees of freedom, an affine transformation in 6 degrees of freedom, and a perspective transformation in 8 degrees of freedom.

The local transform module 822 determines homography transform functions for warp image tiles 408. In some embodiments, the local transform module 822 determines a homography transform function for each warp image tile 408. The homography transform function may be different for each image tile 408. Parameters of a homography transform function are determined using an optimization algorithm. The parameters are based on local motion vectors 518 that indicate magnitude and directional differences between reference feature locations 814 in a reference tile 406 and adjusted feature locations 820 in a corresponding warp image tile 408. In particular, the parameters are selected so that if the holography transform function is applied to the warp image tile 408, the adjusted feature locations 820 of the tile be closer to the reference feature locations 814. For example, parameters of a homography transform function are determined by performing a least squares algorithm on the reference feature locations 814 and the adjusted feature locations 820. The local transform module 822 may select parameters that result in a transformation with the smallest error or an error that is bellow a predetermined threshold.

After homography transform functions are determined for a set of warp image tiles 408, the local transform module 822 determines grid points of the mesh grid 620 by processing the homography transform functions. For example, grid points are determined by interpolating (e.g., bilateral interpolating) parameters of the homography transform functions (e.g., the four nearest homography transform functions). In this example, the locations of the homography transform functions may be at or near a center location of their associated warp tiles 408. Thus, a transformation matrix may be determined for each grid point (for this reason, grid points may also be referred to as transform parameters). Among other advantages, interpolating the homograph), transform functions results in a mesh grid 620 that includes localized warping, which provides improved alignment of the features compared to global warping.

Figure 9:
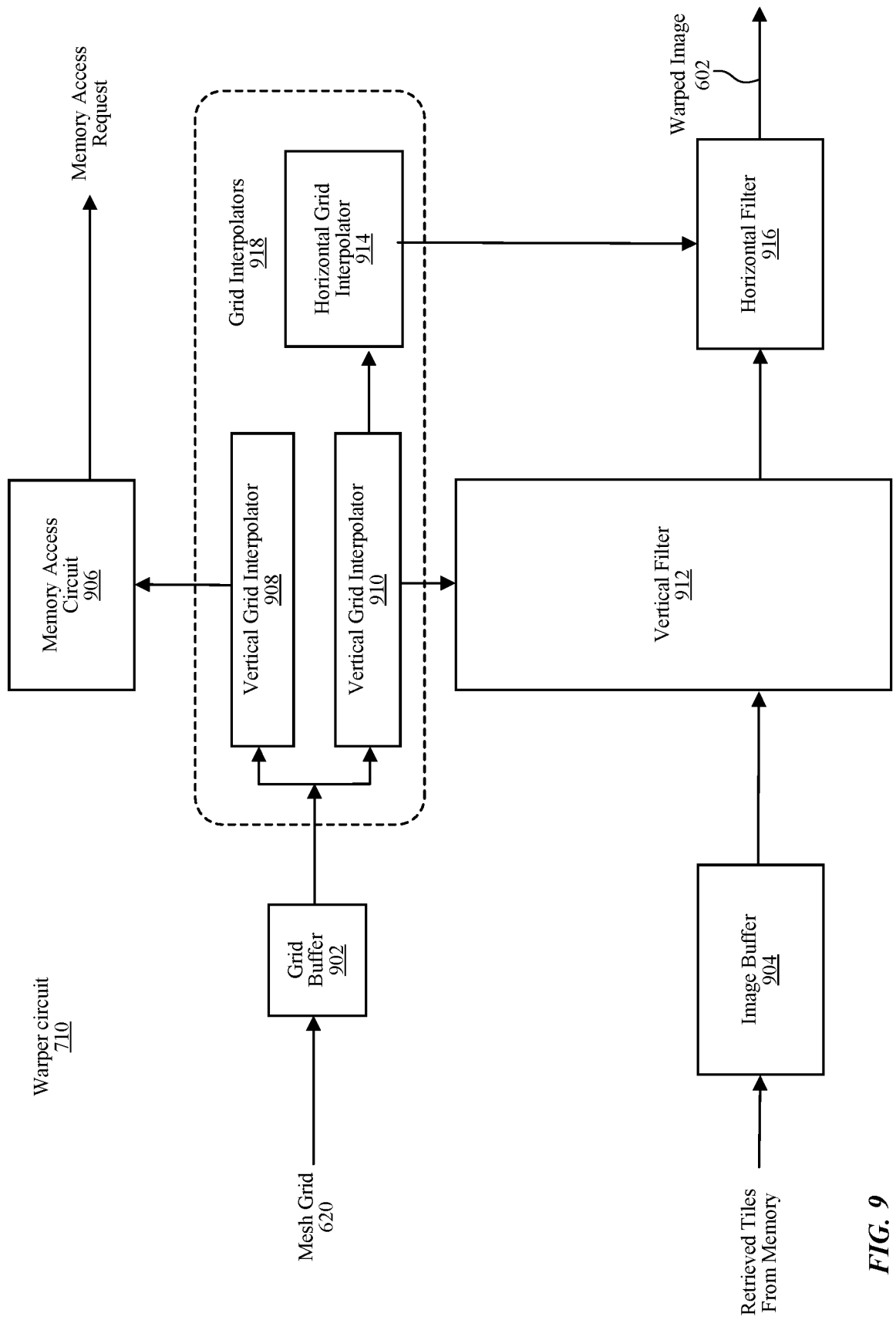
FIG. 9 is a block diagram illustrating a warper circuit, according to an embodiment.

FIG. 9 is a block diagram illustrating a warper circuit 710, according to an embodiment. The warper circuit 710 reads warp image tiles 408 from system memory 708 based on the mesh grid 620 and performs transformations (e.g., a piecewise image warps) on the image tiles 408 to produce the warped image 602.

The warper circuit 710 can read image tiles 408 directly from memory 708 (e.g., in a non-raster order (i.e., read from memory in any order, not necessarily line by line)) to facilitate more warping. In the embodiment illustrated in FIG. 9, the warper circuit 710 includes a grid buffer 902, an image buffer 904, a memory access circuit 906, grid interpolators 918, a vertical filter 912, and a horizontal filter 916. The grid interpolators 918 include two vertical grid interpolators 908 and 910, and a horizontal grid interpolator 914.

The grid buffer 902 stores pixel coordinate mappings of the mesh grid 620 and provides the pixel coordinate location mappings to the vertical grid interpolators 908 and 910 throughout the warping process. The mesh grid 620 can be a coarse grid that does not include pixel coordinate location mappings for each coordinate of the warped image 404, but instead only includes a single pixel coordinate location mapping for a group of pixels (e.g., one in every 1,024 pixels of the warped image 404. For example, each pixel coordinate location mapping is separated from the next pixel coordinate location mapping by 32 pixels in the horizontal direction and by 32 pixels in the vertical direction. In some embodiments, the grid buffer 902 can store four lines of the mesh grid 620, where each line is a maximum of 145 grid points in width.

The grid interpolators 918 perform interpolation of input coordinates of the mesh grid 620. The grid interpolators 918 may trace the mesh grid 620 in raster order (i.e., horizontally on a line by line basis) and may compute a fractional input Y coordinate for each integral X coordinate, and may fetch a new pair of grid coordinates from the grid buffer 902 for every 32 pixels of output.

The grid interpolators 918 include a vertical grid interpolator 908, a second vertical grid interpolator 910, and a horizontal grid interpolator 914, Vertical grid interpolator 908 is used to drive the memory access circuit 906, which formats memory access requests to fetch additional image tiles from memory 708 for storage in the image buffer 904. Vertical grid interpolator 910 is used to drive the vertical filter 912. Both vertical grid interpolators 908 and 910 produce the same interpolation results but do so at different times. Vertical grid interpolator 908 pre-generates pixel coordinate locations of the input image 916 so that image tiles 408 at those coordinates can be pre-fetched into the image buffer 904. At a later point in time, the vertical grid interpolator 910 generates the same coordinates of the input mage 916 and requests processing on the image tiles 408 at those coordinates, which are already pre-fetched into image buffer 904.

The horizontal grid interpolator 914 computes horizontal interpolations of input coordinates to be passed to the horizontal filter 916 using the grid coordinates generated by the vertical grid interpolator 910.

The image buffer 904 stores image tiles and is used for facilitating the warping process. The size of the image buffer 904 may be smaller than the size of the input image. For example, the buffer 904 can store less than 10% of the warp image 404. In another example, the image buffer 904 includes 12 line buffers, where each line buffer is 4,608 samples in width, that are used to temporarily store image tiles 408 read from memory 708. Each image tile 408 may be written to exactly one location in the image buffer 904. If each image tile 408 retrieved from memory 708 is 32×4 samples, the image buffer 904 can accommodate 144 columns and 3 rows of tiles. Within each respective tile column, the 3 rows of tiles act as a sliding-window within that column.

The vertical filter 912 filters each column of the sliding-window with a 9-tap vertical polyphase filter. The vertical filter 912 reads image tiles from the image buffer 904 to produce a stream of vertically-filtered pixels that it passes directly to the horizontal filter 916 for 9-tap horizontal polyphase filtration. In some embodiments, if a requested image tile is unavailable in the image buffer 904, the vertical filter 912 will stall until the image tile is available.

Example Process of Performing Local Warping

Figure 10:
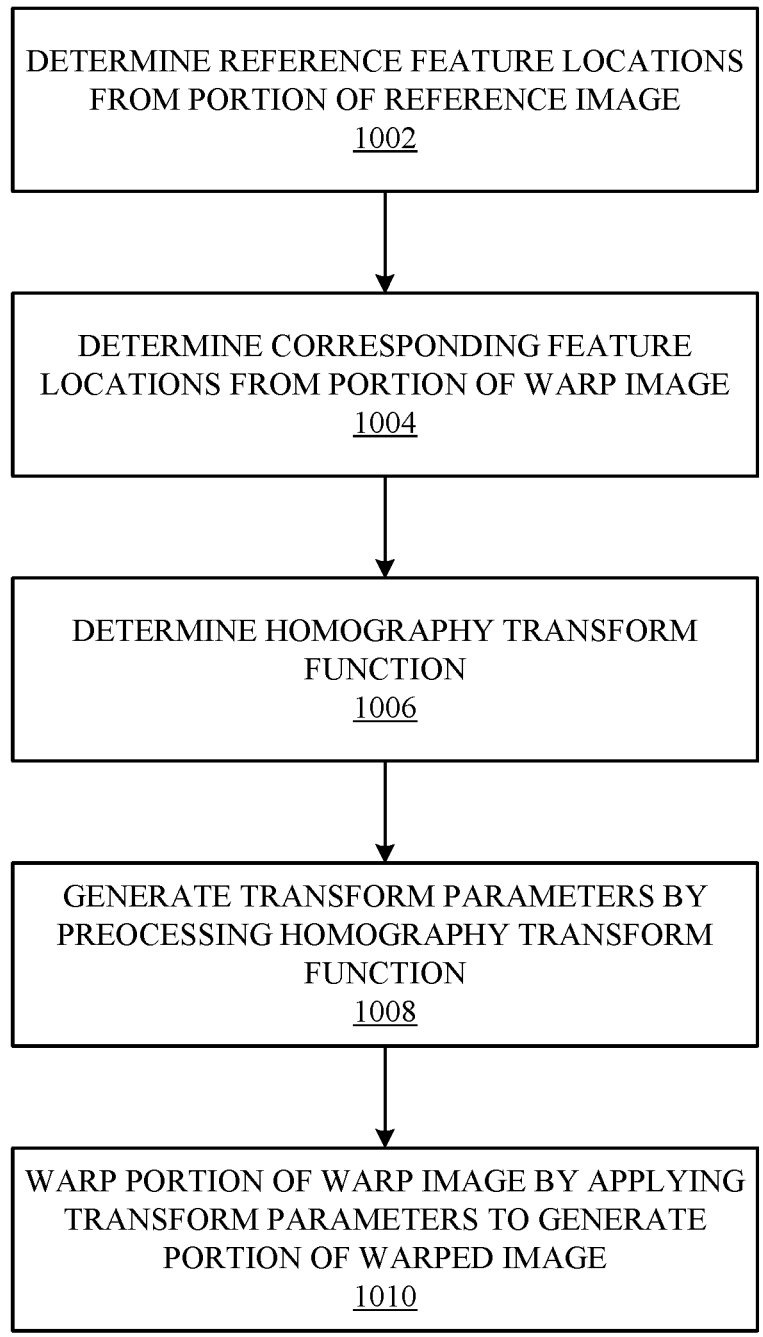
FIG. 10 is a flowchart of a method for performing local warping, according to an embodiment.

FIG. 10 is a flowchart of a method for performing local warping, according to an embodiment. In particular, groups of pixels in the warp image are warped independently of each other, according to an embodiment. The steps of method may be performed in different orders, and the method may include different, additional, or fewer steps.

First reference feature locations from a first portion of a reference image are determined 1002, and first corresponding feature locations from a first portion of a warp image are determined 1004.

Global transform parameters may be determined. The global transform parameters represent a global translation between the reference image and the warp image. The global transform parameters may be determined by a random sample consensus (RANSAC) algorithm. The first corresponding feature locations are generated based on the global transform parameters.

A first homography transform function that transforms versions of the first corresponding feature locations to the first reference feature locations is determined 1006. The homography transform function has a first error representing a difference between the transformed first corresponding feature locations and the first reference feature locations below a threshold level. An optimization algorithm may be used to determine the homography transform function. For example, the optimization algorithm is a least squares algorithm. The homography transform function may represent two or more degrees of freedom.

First transform parameters are generated 1008 by processing the first homography transform function. The first portion of the warp image is warped 1010 by at least applying the first transform parameters to generate a first portion of a warped image.

It should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the embodiments, which is set forth in the following claims. Furthermore, unless stated otherwise, modules can be implemented as software or hardware.

What is claimed is:

1. An apparatus for image processing, the apparatus comprising:
a feature extractor configured to determine first reference feature locations from a first portion of a reference image and first corresponding feature locations from a first portion of a warp image to be warped based on the reference image;
a global adjustment module configured to determine global transform parameters representing a global transformation between the reference image and the warp image and configured to generate adjusted first corresponding feature locations based on the global transform parameters and the first corresponding feature locations;
a local transform module coupled to the feature extractor, and configured to:
determine a first homography transform function that transforms the adjusted first corresponding feature locations to the first reference feature locations with a first error representing a difference between the transformed first corresponding feature locations and the first reference feature locations below a threshold level,
determine a second homography transform function associated with a second portion of the reference image and a second portion of the warp image, and
generate first transform parameters by processing the first homography transform function;
generate second transform parameters by processing the second homography transform function; and
a warper circuit coupled to the local transform module, the warper circuit configured to warp the first portion of the warp image by at least applying the first transform parameters to generate a first portion of a warped image and further configured to warp the second portion of the warp image by at least applying the second transform parameters to generate a second portion of the warped image.

2. The apparatus of claim 1, wherein:
the feature extractor is further configured to determine second reference feature locations from the second portion of the reference image and second corresponding feature locations from the second portion of the warp image,
the global adjustment module is further configured to generate adjusted second corresponding feature locations based on the global transform parameters and the second corresponding feature locations,
the second homography transform function is a function that transforms the adjusted second corresponding feature locations to the second reference feature locations with a second error representing a difference between the transformed second corresponding feature locations and the second reference feature locations below the threshold level, and
the first homography function and the second homography function are different.

3. The apparatus of claim 2, wherein the first transform parameters map locations in the first portion of the warp image to first locations in the warped image, and wherein the second transform parameters map locations in the second portion of the warp image to second locations in the warped image.

4. The apparatus of claim 3, wherein the first transform parameters are associated with a location in the first portion of the warp image and are generated by bilateral interpolating four homography transform functions of four portions of the warp image closest to the location, the four homography transform functions including the first homography transform function and the second homography transform function, the four portions of the warp image including the first portion and the second portion of the warp image.

5. The apparatus of claim 1, wherein the global transform parameters are determined by a random sample consensus (RANSAC) algorithm.

6. The apparatus of claim 1, wherein the local transform module applies an optimization algorithm to determine the first homography transform function.

7. The apparatus of claim 6, wherein the optimization algorithm comprises a least squares algorithm.

8. The apparatus of claim 1, wherein the first homography transform function represents two or more degrees of freedom.

9. A method comprising:
  determining first reference feature locations from a first portion of a reference image;
  determining first corresponding feature locations from a first portion of a warp image;
  determining global transform parameters representing a global transformation between the reference image and the warp image and configured to generate adjusted first corresponding feature locations based on the global transform parameters and the first corresponding feature locations;
  determining a first homography transform function that transforms the adjusted first corresponding feature locations to the first reference feature locations with a first error representing a difference between the transformed first corresponding feature locations and the first reference feature locations below a threshold level;
  determining a second homography transform function associated with a second portion of the reference image and a second portion of the warp image;
  generating first transform parameters by processing the first homography transform function;
  generating second transform parameters by processing the second homography transform function;
  warping the first portion of the warp image by at least applying the first transform parameters to generate a first portion of a warped image; and
  warping the second portion of the warp image by at least applying the second transform parameters to generate a second portion of the warped image.

10. The method of claim 9, further comprising:
  determining second reference feature locations from the second portion of the reference image;
  determining second corresponding feature locations from the second portion of the warp image; and
  generating adjusted second corresponding feature locations based on the global transform parameters and the second corresponding feature locations,
  wherein the second homography transform function is a function that transforms the adjusted second corresponding feature locations to the second reference feature locations with a second error representing a difference between the transformed second corresponding feature locations and the second reference feature locations below the threshold level, and
  wherein the first homography function and the second homography function are different.

11. The method of claim 10, wherein the first transform parameters map locations in the first portion of the warp image to first locations in the warped image, and wherein the second transform parameters map locations in the second portion of the warp image to second locations in the warped image.

12. The method of claim 11, wherein the first transform parameters are associated with a location in the first portion of the warp image and are generated by bilateral interpolating four homography transform functions of four portions of the warp image closest to the location, the four homography transform functions including the first homography transform function and the second homography transform function, the four portions of the warp image including the first portion and the second portion of the warp image.

13. The method of claim 9, wherein determining the first homography transform function comprises applying an optimization algorithm comprising a comprises a least squares algorithm.

14. The method of claim 9, wherein the first homography transform function represents two or more degrees of freedom.

15. An electronic device comprising:
  An image sensor configured to capture image data; and
  an image processor comprising:
    a feature extractor configured to determine first reference feature locations from a first portion of a reference image and first corresponding feature locations from a first portion of a warp image to be warped based on the reference image;
    a global adjustment module configured to determine global transform parameters representing a global transformation between the reference image and the warp image and configured to generate adjusted first corresponding feature locations based on the global transform parameters and the first corresponding feature locations;
    a local transform module coupled to the feature extractor, and configured to:
      determine a first homography transform function that transforms the adjusted first corresponding feature locations to the first reference feature locations with a first error representing a difference between the transformed first corresponding feature locations and the first reference feature locations below a threshold level,
      determine a second homography transform function associated with a second portion of the reference image and a second portion image, and
      generate first transform parameters by processing the first homography transform function;
      generate second transform parameters by processing the second homography transform function; and
    a warper circuit coupled to the local transform module, the warper circuit configured to warp the first portion of the warp image by at least applying the transform first transform parameters to generate a first portion of a warped image and further configured to warp the second portion of the warp image by at least applying the second transform parameters to generate a second portion of the warped image.

16. The electronic device of claim 15, wherein:
  the feature extractor is further configured to determine second reference feature locations from the second portion of the reference image and second corresponding feature locations from the second portion of the warp image,
  the global adjustment module is further configured to generate adjusted second corresponding feature locations based on the global transform parameters and the second corresponding feature locations,
  the second homography transform function is a function that transforms the adjusted second corresponding feature locations to the second reference feature locations with a second error representing a difference between the transformed second corresponding feature locations and the second reference feature locations below the threshold level, and the first homography function and the second homography function are different.

17. The electronic device of claim 16, wherein the first transform parameters map locations in the first portion of the warp image to first locations in the warped image, and wherein the second transform parameters map locations in the second portion of the warp image to second locations in the warped image.

18. The electronic device of claim 17, wherein the first transform parameters are associated with a location in the first portion of the warp image and are generated by bilateral interpolating four homography transform functions of four portions of the warp image closest to the location, the four homography transform functions including the first homography transform function and the second homography transform function, the four portions of the warp image including the first portion and the second portion of the warp image.

19. The electronic device of claim 15, wherein the local transform module applies an optimization algorithm to determine the first homography transform function, and the optimization algorithm comprises a least squares algorithm.

20. The electronic device of claim 15, wherein the first homography transform function represents two or more degrees of freedom.

\* \* \* \* \*

UNITED STATES PATENT AND TRADEMARK OFFICE
CERTIFICATE OF CORRECTION

PATENT NO. : 11,164,283 B1
APPLICATION NO. : 16/858134
DATED : November 2, 2021
INVENTOR(S) : Kaiming Liu et al.

Page 1 of 1

It is certified that error appears in the above-identified patent and that said Letters Patent is hereby corrected as shown below:

In the Claims

Column 22, Claim 13, Line 12: delete "comprises a"

Column 22, Claim 15, Line 50: delete "transform" after "the"

Signed and Sealed this
Twenty-sixth Day of April, 2022

Katherine Kelly Vidal
*Director of the United States Patent and Trademark Office*